E. CHONG.
METHOD OF MAKING NOODLES.
APPLICATION FILED SEPT. 9, 1909.
945,222.
Patented Jan. 4, 1910.
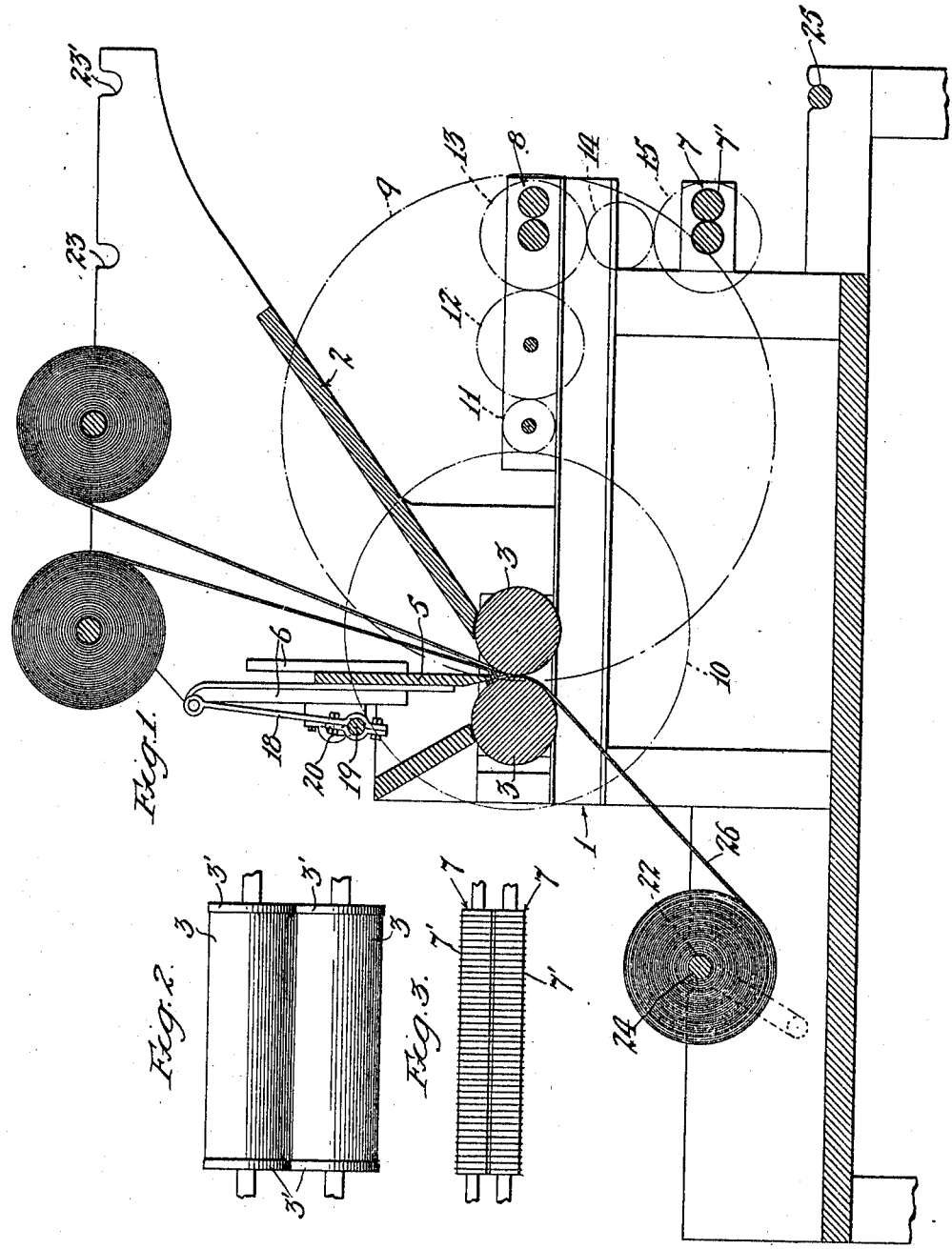

UNITED STATES PATENT OFFICE.

EDWARD CHONG, OF LOS ANGELES, CALIFORNIA.

METHOD OF MAKING NOODLES.

945,222.　　　　Specification of Letters Patent.　　Patented Jan. 4, 1910.

Application filed September 9, 1909. Serial No. 516,962.

*To all whom it may concern:*

Be it known that I, EDWARD CHONG, a subject of the Emperor of China, residing at Los Angeles, in the county of Los Angeles and State of California, have invented a new and useful Method of Making Noodles, of which the following is a specification.

The main object of this invention is to provide a method whereby noodles may be continuously manufactured in large quantities and of satisfactory and uniform quality.

A further object of the invention is to provide a method whereby the dough may be kneaded and worked in such manner as to produce the requisite toughness or fiber in the noodles.

The accompanying drawings illustrate an apparatus suitable for carrying out the method.

Figure 1 is a longitudinal, vertical section of the apparatus. Fig. 2 is a plan of the pressure rolls. Fig. 3 is a plan of the cutting rolls.

The essential feature of the method consists in working the dough between convergent moving surfaces in such manner that it is formed into a continuous sheet, forming a plurality of such sheets, then running said sheets concurrently between said working surfaces to cause the sheets to coalesce or lap together in a single sheet, repeating this operation until the required toughness and fiber of the dough is secured, and cutting the final sheet into strips to form the noodles.

The machine for carrying out the process consists of a frame 1 formed with a hopper or trough 2, pressure rollers 3 mounted side by side in journals on said frame and extending at the bottom of said hopper, a kneading or packing member 5 working in vertical guides 6 to be removable toward and from the pressure rollers 3, cutting rolls 7 journaled on the frame 1, and feed rolls 8 for supplying the sheets to the cutting rolls. The pressure rollers 3, feed rolls 8, and cutting rolls 7 are driven by gearing indicated in dotted lines at 9, 10, 11, 12, 13, 14 and 15, or by any suitable means. The vertically reciprocating packing means 6 is operated by a link connection 18 with a crank member 19 on a shaft 20 driven, for example, from the gear 10 aforesaid. The lower end of the member 5 is beveled and extends over the concavity formed between the two pressure rollers 3, and preferably somewhat forward of the center line. Suitable notches or seats 22 are formed in the frame 1 below the pressure rollers 3 to receive the spindle 24 for supporting the rolled sheet and other notches 23, 23′ are formed in the upper portion of the hopper 2 to receive said spindles, such spindles as hereinafter set forth. The pressure rollers 3 are preferably provided with flanges 3′ at each end to limit the lateral extension or squeezing of the dough. The cutting rolls 8 are provided with circumferential ridges or cutting edges 7′ as shown in Fig. 3.

It will be understood that the illustration of the apparatus is more or less diagrammatic as the present invention relates to the process and may be carried out in other forms of apparatus.

The process is carried out as follows: The dough is placed in the hopper 2 and by means of the packer 5 it is forced in between the pressure rolls 3, said packer also serving to knead or work the dough together. The pressure rolls 3 are spaced at such distance apart that the dough passes between the same in a thin sheet indicated at 26, said sheet being wound on a spindle 24 which may be moved by hand or automatically to wind the sheet of dough thereon. A number of spindles 24 are provided and when one spindle has become wound to a sufficient thickness it is removed and another substituted. When a plurality of rolls of dough sheets have thus been formed any desired number, for example, two of such rolls are placed in the supports or notches 23, and the sheets are led therefrom down into the hopper and through the pressure rolls 3. The vertical reciprocation of the packer 5 together with the rotation of the rolls 3 causes the sheets 26 to be lapped and incorporated into a single sheet which issues from between the rollers 3 and is wound on a spindle 24 as before. This sheet is of greater toughness and density than the original or first formed sheet and this lapping and condensing operation may be repeated as often as is necessary to secure the required toughness and density for the sheet. When this has been secured the roll is placed with the spindle 24 in one of the rear notches 23′ on the hopper 2 and the sheet of dough led between the feed rolls 8 and the cutting rolls 7 to cut the same into strips which are dried in the usual manner, said strip being first placed on a spindle supported in notches 25 on the frame 1.

What I claim is:

1. The method of making noodles which consists in forming dough into a continuous sheet by passing it between convergent surfaces, lapping a plurality of such sheets and passing such lapped sheets between the plurality of convergent working surfaces to cause the same to be incorporated into a single sheet, and subsequently cutting the sheet into strips.

2. The method of making noodles which consists in working a mass of dough by mechanical pressure, forcing said dough between convergent moving surfaces to form the dough into a continuous sheet, lapping a plurality of said sheets, forcing such lapped sheets between convergent moving surfaces to form a second sheet of greater toughness and density than the first sheets, repeating this lapping and condensing operation until a sheet of the requisite toughness and density is secured, and cutting the resultant sheet into strips.

In testimony whereof, I have hereunto set my hand at Los Angeles, California, this 3rd day of September 1909.

EDWARD CHONG.

In presence of—
ARTHUR P. KNIGHT,
FRANK L. A. GRAHAM.